US012338782B2

(12) United States Patent
Ishida

(10) Patent No.: US 12,338,782 B2
(45) Date of Patent: Jun. 24, 2025

(54) AIR CLEANER AND STRADDLED VEHICLE INCLUDING THE SAME

(71) Applicant: YAMAHA HATSUDOKI KABUSHIKI KAISHA, Iwata (JP)

(72) Inventor: Shogo Ishida, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 166 days.

(21) Appl. No.: 18/327,996

(22) Filed: Jun. 2, 2023

(65) Prior Publication Data

US 2024/0003320 A1 Jan. 4, 2024

(30) Foreign Application Priority Data

Jun. 29, 2022 (JP) ................................ 2022-104857

(51) Int. Cl.

*F02M 35/02* (2006.01)
*F02M 35/024* (2006.01)
*F02M 35/10* (2006.01)
*F02M 35/16* (2006.01)

(52) U.S. Cl.

CPC .................. *F02M 35/0204* (2013.01); *F02M 35/02433* (2013.01); *F02M 35/02466* (2013.01); *F02M 35/02483* (2013.01); *F02M 35/10013* (2013.01); *F02M 35/162* (2013.01)

(58) Field of Classification Search

CPC ......... F02M 35/0204; F02M 35/02433; F02M 35/02466; F02M 35/02483; F02M 35/10013; F02M 35/162; F02M 35/0201; F02M 35/02416; F02M 35/02491

See application file for complete search history.

(56) References Cited

U.S. PATENT DOCUMENTS

2015/0377191 A1* 12/2015 Uezu ..................... B01D 46/62 55/357

FOREIGN PATENT DOCUMENTS

JP 2021-055620 A 4/2021
WO WO-2012095419 A1 * 7/2012 ......... B01D 46/0002

* cited by examiner

*Primary Examiner* — Lindsay M Low
*Assistant Examiner* — Charles J Brauch
(74) *Attorney, Agent, or Firm* — Rabin & Berdo, P.C.

(57) ABSTRACT

An air cleaner includes an air cleaner case, an element disposed in the air cleaner case, and an intake port disposed in the air cleaner case. With respect to an imaginary plane extending in opposite first and second directions, opposite third and fourth directions, and opposite fifth and sixth directions that are perpendicular to each other, the air cleaner case includes a first half located at a side of the fifth direction and a second half located at a side of the sixth direction, with respect to an imaginary plane in which the first to fourth directions extend. The intake port is formed in the first half of the air cleaner case. The air cleaner case includes a closed wall at a position substantially symmetric to a position of the intake port with respect to the imaginary plane.

18 Claims, 11 Drawing Sheets

AIR CLEANER AND STRADDLED VEHICLE INCLUDING THE SAME

CROSS-REFERENCE TO RELATED APPLICATIONS

This application claims the benefit of priority to Japanese Patent Application No. 2022-104857 filed on Jun. 29, 2022. The entire contents of this application are hereby incorporated herein by reference.

BACKGROUND OF THE INVENTION

Field of the Invention

The present invention relates to an air cleaner and a straddled vehicle including the air cleaner.

Description of the Related Art

A straddled vehicle such as a motorcycle conventionally includes an air cleaner that purifies air supplied to an internal combustion engine. The air cleaner includes an air cleaner case and an element disposed in the air cleaner case. The inside of the air cleaner case is partitioned by the element into a dirty side and a clean side. The air cleaner case has an intake port facing the dirty side. Air taken into the dirty side from the intake port flows into the clean side through the element. At this time, dirt included in the air is captured by the element so that the air is thereby purified.

JP2021-55620A discloses an air cleaner in which an intake duct is disposed along the surface of an element. The surface of the element extends downward, and the intake duct extends downward in a dirty side. Air introduced from the intake duct tends to flow downward because of the inertia of flow, and therefore, is supplied to a wide range of the surface of the element. The air cleaner is intended to utilize the entire element effectively.

In this air cleaner, however, air introduced from the intake duct is directly supplied to the surface of the element. Thus, not only relatively small dirt included in the air but also relatively large dirt is captured by the element. Accordingly, the element is relatively easily soiled so that the lifetime of the element might be shortened.

SUMMARY OF THE INVENTION

It is therefore an object of the present teaching to provide an air cleaner that utilizes a wide range of an element effectively and prolongs the lifetime of the element, and a straddled vehicle including the air cleaner.

An air cleaner disclosed here includes: an air cleaner case; an element disposed in the air cleaner case and partitioning inside of the air cleaner case into a clean side and a dirty side; and an intake port disposed in the air cleaner case and connecting outside of the air cleaner case to the dirty side. With respect to an imaginary plane extending in a first direction, a second direction opposite to the first direction, a third direction perpendicular to the first direction, and a fourth direction opposite to the third direction, the air cleaner case includes a first half located at a fifth direction side and a second half located at a sixth direction side, the fifth direction being perpendicular to the first direction and the third direction, the sixth direction being opposite to the fifth direction with respect to the imaginary plane. The element includes a first element side wall extending in the first direction and the fifth direction and a second element side wall extending from the first element side wall in the first direction and the sixth direction. The air cleaner case includes a first case inner surface and a second case inner surface, the first case inner surface extending in the first direction and the fifth direction and facing the first element side wall, the second case inner surface extending from the first case inner surface in the first direction and the sixth direction and facing the second element side wall. The intake port is disposed in the first half of the air cleaner case, located between the first element side wall and the first case inner surface, and open to outside of the air cleaner case. The air cleaner case includes a closed wall at a position symmetric to a portion or whole of the intake port with respect to the imaginary plane.

In the air cleaner, no intake port similar to the intake port of the air cleaner case is formed at a position laterally symmetric to the intake port of the air cleaner case. In the air cleaner case, laterally symmetric airflows are not generated. Air sucked from the intake port passes between the first element side wall and the first case inner surface, and then passes between the second element side wall and the second case inner surface. The air sucked from the intake port flows along the first element side wall and the second element side wall, and thus, a wide range of the element can be utilized effectively. In addition, since air flows along the first case inner surface and the second case inner surface, the air flows around at least a portion of the element. While the air flows along the first case inner surface and the second case inner surface, relatively large dirt included in the air is easily separated from the air by contact with the first case inner surface and the second case inner surface. After relatively large dirt is separated, the air passes through the element. In this manner, in the air cleaner described above, air from which relatively large dirt is separated passes through a wide range of the element. Thus, the element is relatively not easily soiled, and thus, the lifetime of the element is prolonged.

The first through sixth directions are not limited to specific directions. For example, the third direction may be upward. In this case, air sucked from the intake port is likely to turn horizontally. In the dirty side of the air cleaner case, a so-called swirl flow is likely to be formed. The third direction may be leftward. In this case, air sucked from the intake port is likely to turn vertically. In the dirty side of the air cleaner case, a so-called tumble flow is likely to be formed.

The first direction, the second direction, the third direction, and the fourth direction may be forward, rearward, upward, and downward, respectively, one of the fifth direction and the sixth direction may be leftward, and the other may be rightward.

In this case, air sucked from the intake port is likely to turn horizontally. In the dirty side of the air cleaner case, a swirl flow is likely to be formed. While air flows around the element, dirt separated from the air by contact with the first case inner surface and the second case inner surface tends to be dropped by gravity. Before air passes through the element, relatively large dirt is easily separated from the air.

The first direction, the second direction, the third direction, the fourth direction may be forward, rearward, upward, and downward, respectively. One of the fifth direction and the sixth direction may be leftward, and the other may be rightward. The air cleaner case may include a groove having a first bottom surface and a second bottom surface, the first bottom surface being located between the first element side wall and the first case inner surface, the second bottom surface being located between the second element side wall and the second case inner surface.

In this case, dirt separated and dropped from air is collected in the groove. The dirt separated from air can be removed by cleaning the groove. This configuration eases maintenance of the air cleaner.

The element may include a third element side wall located at the sixth direction side of the second element side wall and extending in the second direction and the sixth direction. The air cleaner case may include a third case inner surface located at the sixth direction side of the second case inner surface, extending in the second direction and the sixth direction, and facing the third element side wall.

In this case, air sucked from the intake port passes between the first element side wall and the first case inner surface and between the second element side wall and the second case inner surface, and then passes between the third element side wall and the third case inner surface. The air turns more than a half of the perimeter of the element. Accordingly, the air can flow along a large area of the side wall of the element, and the air can flow along a large area of the inner surface of the air cleaner case. The element can be further effectively utilized, and dirt can be more easily separated from air.

The first direction, the second direction, the third direction, and the fourth direction may be forward, rearward, upward, and downward, respectively. One of the fifth direction and the sixth direction may be leftward, and the other may be rightward. The air cleaner case may include a groove having a first bottom surface, a second bottom surface, and a third bottom surface, the first bottom surface being located between the first element side wall and the first case inner surface, the second bottom surface being located between the second element side wall and the second case inner surface, the third bottom surface being located between the third element side wall and the third case inner surface.

In this case, dirt separated and dropped from air is collected in the groove. The dirt separated from air can be removed by cleaning the groove. This configuration eases maintenance of the air cleaner.

The element may include a fourth element side wall extending from the third element side wall in the second direction and the fifth direction. The air cleaner case may include a fourth case inner surface extending from the third case inner surface in the second direction and the fifth direction and facing the fourth element side wall.

In this case, air sucked from the intake port passes between the first element side wall and the first case inner surface, between the second element side wall and the second case inner surface, and between the third element side wall and the third case inner surface, and then, passes between the fourth element side wall and the fourth case inner surface. The air turns around more than ¾ of the perimeter of the element. Accordingly, the air can flow along a large area of the side wall of the element, and the air can flow along a large area of the inner surface of the air cleaner case. The element can be further effectively utilized, and dirt can be more easily separated from air.

The first direction, the second direction, the third direction, and the fourth direction may be forward, rearward, upward, and downward, respectively. One of the fifth direction and the sixth direction may be leftward, and the other may be rightward. The air cleaner case may include a groove having a first bottom surface, a second bottom, a third bottom surface, and a fourth bottom surface, the first bottom surface being located between the first element side wall and the first case inner surface, the second bottom surface being located between the second element side wall and the second case inner surface, the third bottom surface being located between the third element side wall and the third case inner surface, the fourth bottom surface being located between the fourth element side wall and the fourth case inner surface.

In this case, dirt separated and dropped from air is collected in the groove. The dirt separated from air can be removed by cleaning the groove. This configuration eases maintenance of the air cleaner.

The element may include a fifth element side wall extending from the fourth element side wall in the fifth direction. The air cleaner case may include a fifth case inner surface extending from the fourth case inner surface in the fifth direction and facing the fifth element side wall.

In this case, air sucked from the intake port passes between the first element side wall and the first case inner surface, between the second element side wall and the second case inner surface, between the third element side wall and the third case inner surface, and between the fourth element side wall and the fourth case inner surface, and then, passes between the fifth element side wall and the fifth case inner surface. The air turns around the element more than once. Accordingly, the air can flow along a large area of the side wall of the element, and the air can flow along a large area of the inner surface of the air cleaner case. The element can be further effectively utilized, and dirt can be more easily separated from air.

The first direction, the second direction, the third direction, and the fourth direction may be forward, rearward, upward, and downward, respectively. One of the fifth direction and the sixth direction may be leftward, and the other may be rightward. The air cleaner case may include a groove having a first bottom surface, a second bottom surface, a third bottom surface, a fourth bottom surface, and a fifth bottom surface, the first bottom surface being located between the first element side wall and the first case inner surface, the second bottom surface being located between the second element side wall and the second case inner surface, the third bottom surface being located between the third element side wall and the third case inner surface, the fourth bottom surface being located between the fourth element side wall and the fourth case inner surface, the fifth bottom surface being located between the fifth element side wall and the fifth case inner surface.

In this case, dirt separated and dropped from air is collected in the groove. The dirt separated from air can be removed by cleaning the groove. This configuration eases maintenance of the air cleaner.

The intake port may be open in the second direction and the sixth direction toward outside of the air cleaner case.

In this case, air sucked from the intake port is likely to flow along the first element side wall and the first case inner surface.

The second half of the air cleaner case may have no intake port connecting outside of the air cleaner case to the dirty side.

In this case, since no air is sucked from the second half, air sucked from the intake port of the first half is likely to generate an airflow (e.g., swirl flow) turning around the element. In addition, the air is likely to turn along the case inner surface. Thus, the advantages described above are easily obtained.

The air cleaner case may have only the intake port disposed in the first half as an intake port connecting outside of the air cleaner case to the dirty side.

In this configuration, only one intake port is provided. Air intensively sucked from the intake port of the first half is likely to generate an airflow (e.g., swirl flow) turning around the element. In addition, the air is likely to turn along the case inner surface. Thus, the advantages described above are easily obtained.

The element may have a domical shape.

In this case, purification performance can be enhanced with size reduction of the air cleaner.

An entire surface of the element may have a mesh pattern.

In this case, the air is purified in the entire surface of the element, and thus, purification performance is enhanced with size reduction of the air cleaner.

The air cleaner case may include a base and a cover disposed at a third direction side with respect to the base. The element may be disposed between the base and the cover.

In this configuration, the element is exposed by detaching the cover from the base. The element is easily replaced and cleaned. Thus, the air cleaner is easily maintained.

A straddled vehicle disclosed here includes: the air cleaner, an intake pipe connected to the clean side of the air cleaner case; and an internal combustion engine connected to the intake pipe.

According to the present teaching, it is possible to provide an air cleaner that utilizes a wide range of an element effectively and prolongs the lifetime of the element and a straddled vehicle including the air cleaner.

DETAILED DESCRIPTION OF THE PREFERRED EMBODIMENTS

Figure 1:
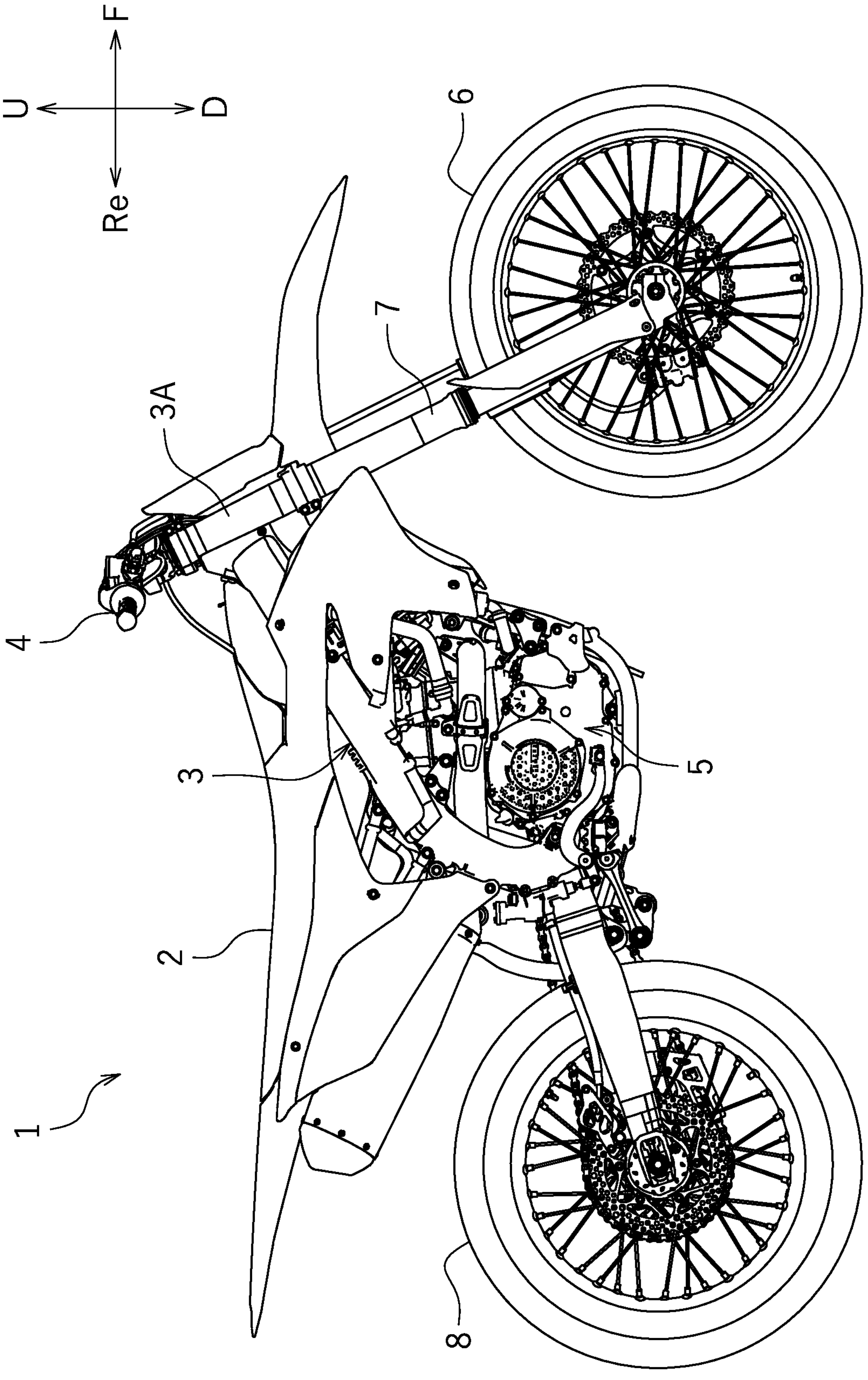
FIG. 1 is a right side view of a motorcycle according to one preferred embodiment.

An air cleaner and a straddled vehicle according to one preferred embodiment will be described with reference to the drawings. FIG. 1 is a right side view of a motorcycle 1 as an example of the straddled vehicle.

Unless otherwise specified, front, rear, left, right, up, and down as used in the description below refer to front, rear, left, right, up, and down, respectively, as seen from an imaginary passenger sitting on a seat 2 in a case where the motorcycle 1 on which no passenger sits and no load is mounted is stationary in an upright position on a horizontal plane. Characters F, Re, L, R, U, and D in the drawings represent front, rear, left, right, up, and down, respectively.

The motorcycle 1 includes a body frame 3 having a head pipe 3A, the seat 2 on which a passenger sits, an internal combustion engine (hereinafter referred to as an engine) 5, a front wheel 6, and a rear wheel 8. The head pipe 3A supports an unillustrated steering shaft such that the steering shaft is rotatable leftward and rightward. A handlebar 4 is fixed to an upper portion of the steering shaft. A front fork 7 is fixed to a lower portion of the steering shaft. The front wheel 6 is supported by the front fork 7.

Figure 2:
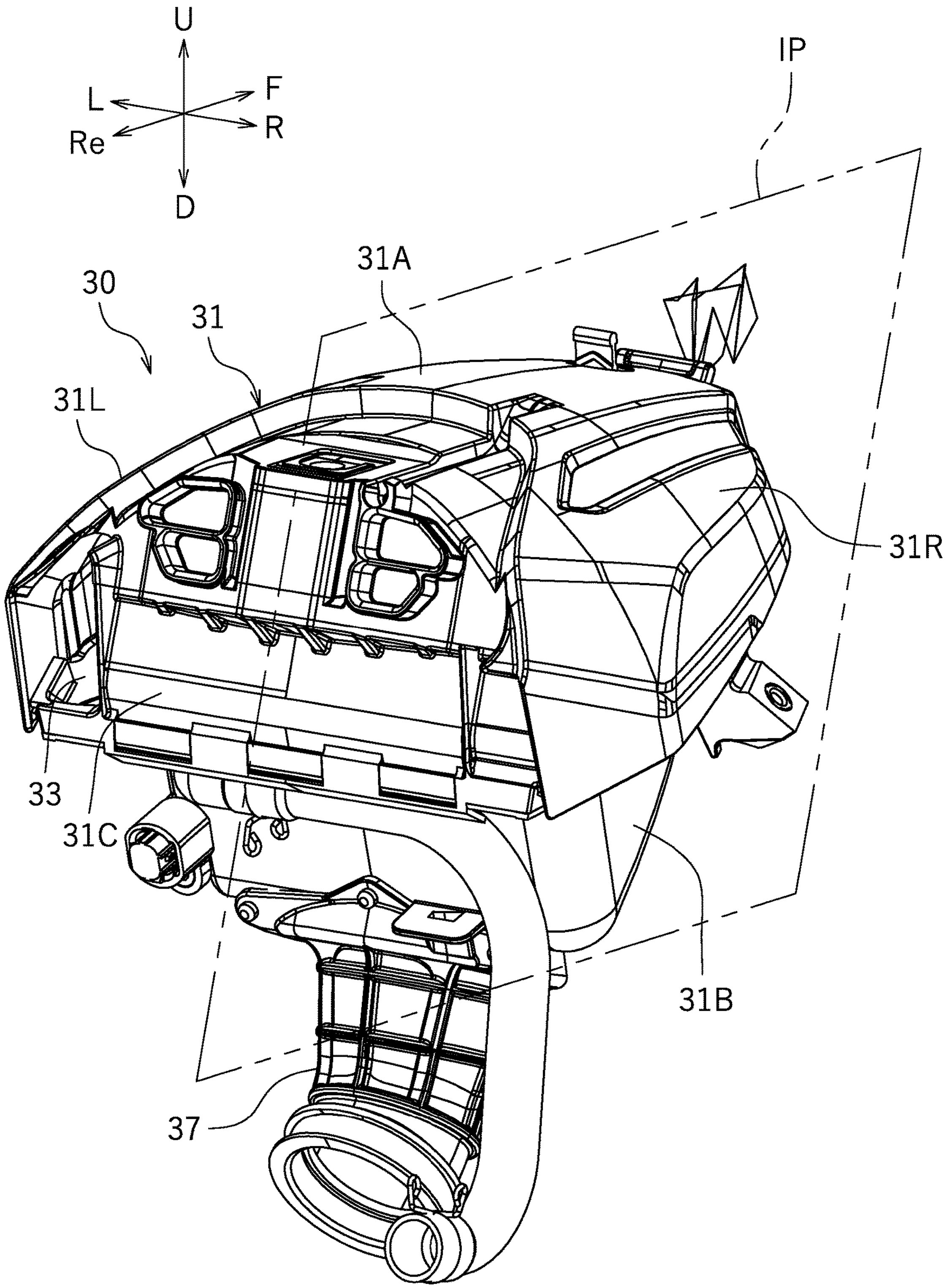
FIG. 2 is a perspective view of an air cleaner according to one preferred embodiment.
Figure 3:
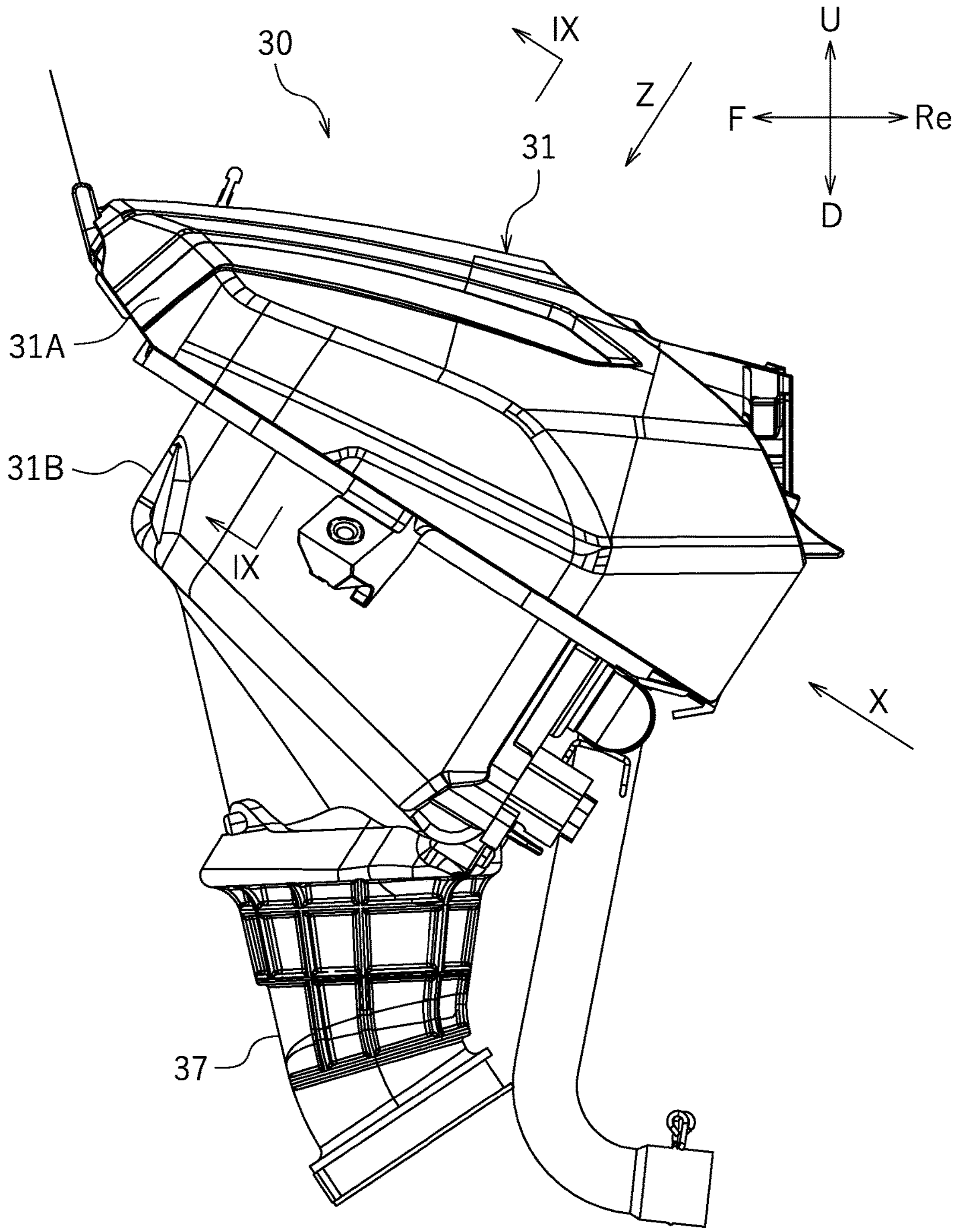
FIG. 3 is a left side view of the air cleaner.
Figure 4:
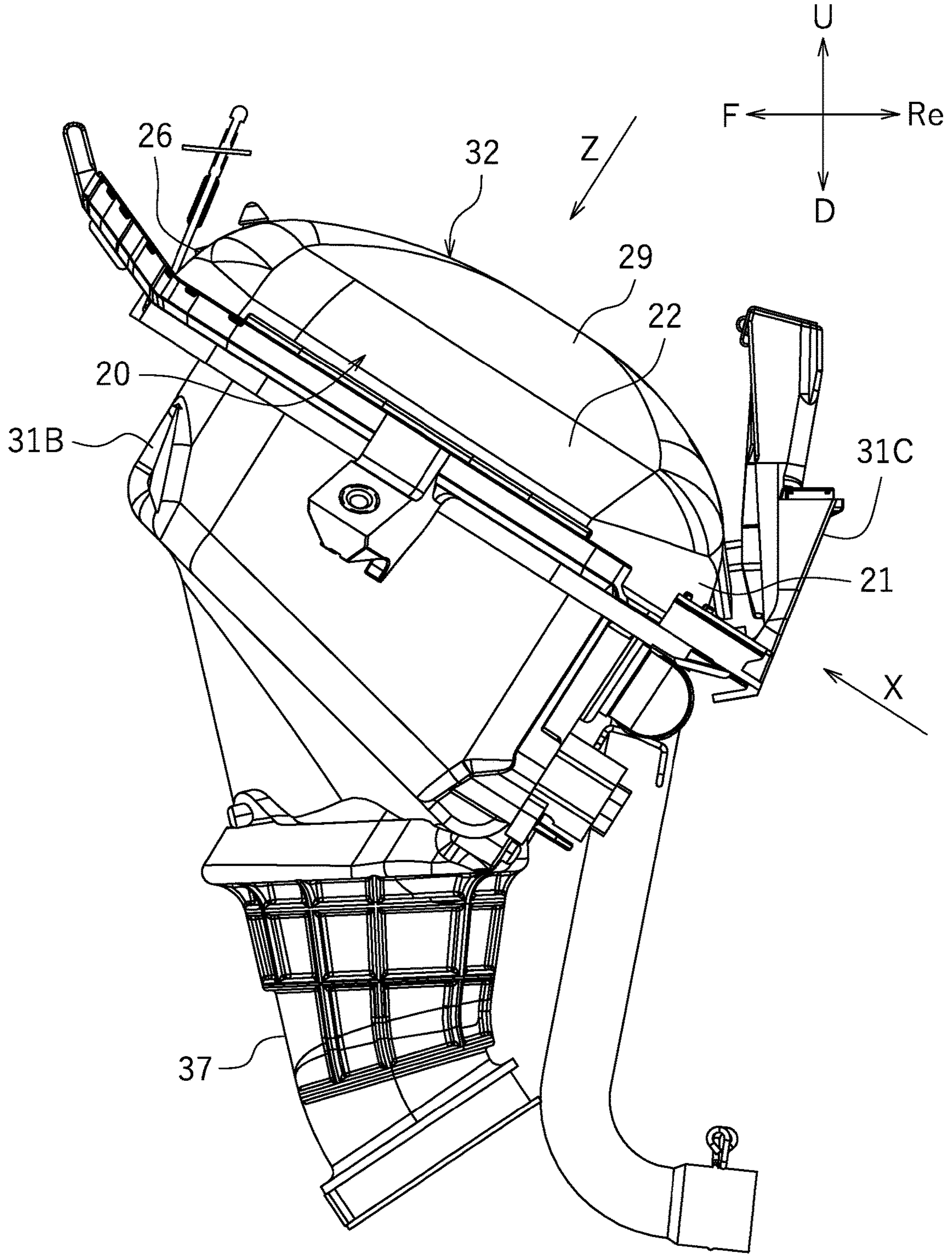
FIG. 4 is a left side view of the air cleaner from which a cover is detached.

An air cleaner 30 illustrated in FIG. 2 is disposed above the engine 5. FIG. 3 is a left side view of the air cleaner 30. As illustrated in FIG. 3, the air cleaner 30 includes an air cleaner case 31 having a base 31B and a cover 31A. In this preferred embodiment, the cover 31A is disposed above the base 31B. The cover 31A is detachably attached to the base 31B. FIG. 4 is a left side view of the air cleaner 30 from which the cover 31A is detached. The air cleaner 30 includes an element 32 disposed between the base 31B and the cover 31A. The element 32 partitions the inside of the air cleaner case 31 into a clean side and a dirty side. In this preferred embodiment, the clean side is located below the element 32, and the dirty side is located above the element 32. Specifically, the space defined by the cover 31A and the element 32 is the dirty side. The space defined by the base 31B and the element 32 is the clean side.

The base 31B is connected to an intake pipe 37. The intake pipe 37 is connected to the clean side of the air cleaner case 31. The intake pipe 37 is connected to the engine 5 (see FIG. 1). Air in the clean side is sucked into the engine 5 through the intake pipe 37.

Figure 5:
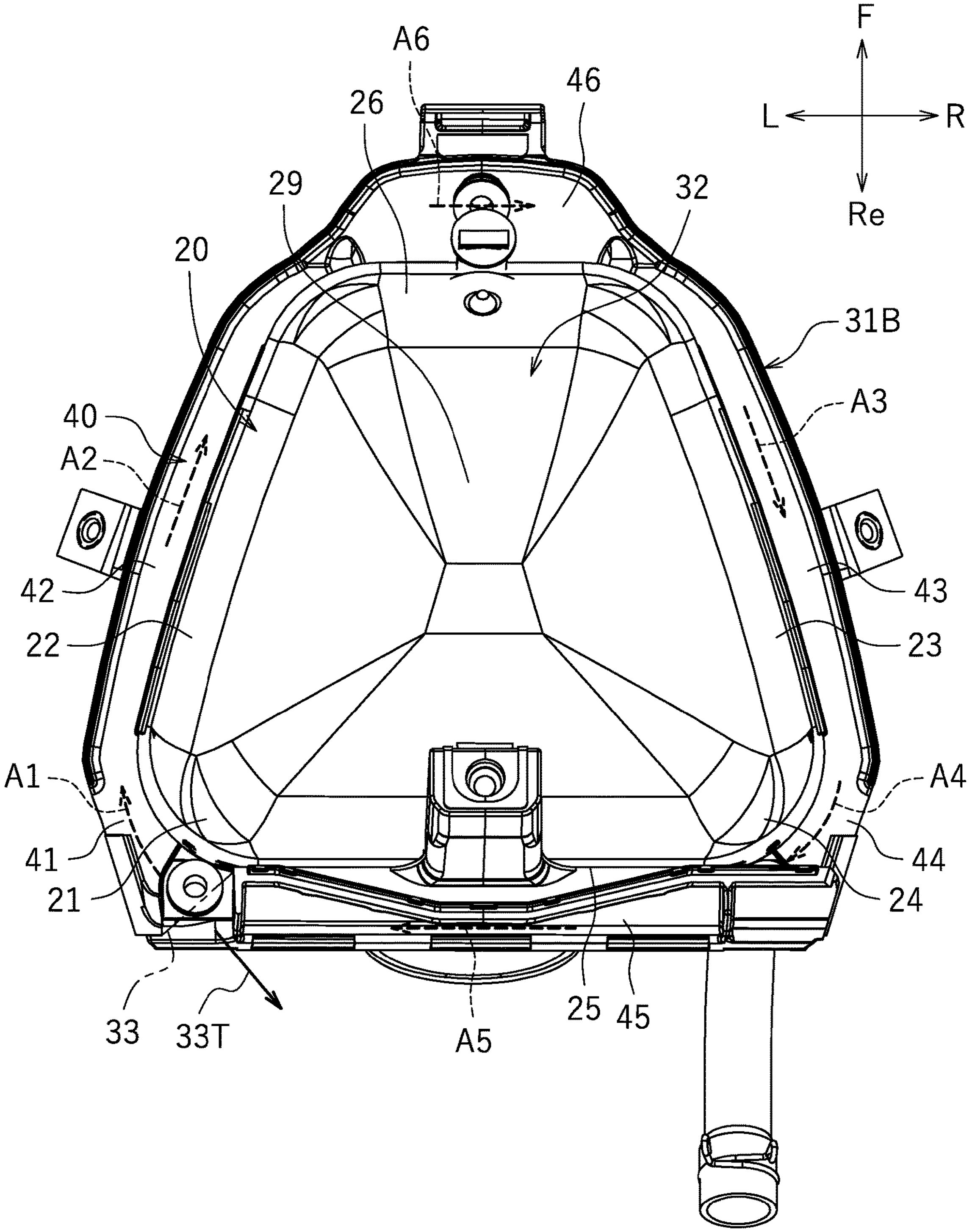
FIG. 5 is a view of the air cleaner from which the cover is detached when seen in a Z direction in FIG. 4.
Figure 6:
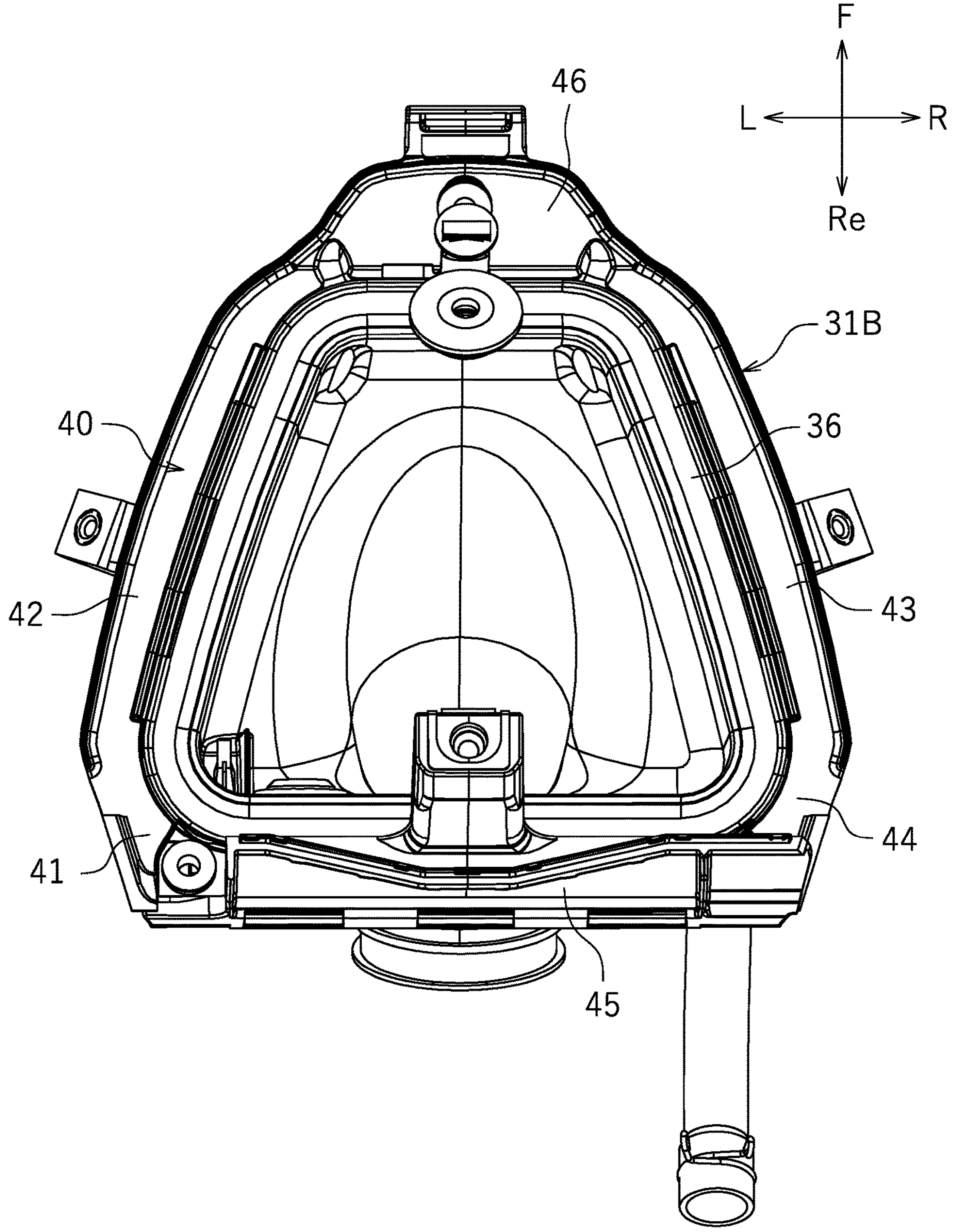
FIG. 6 is a view in which an element is detached in FIG. 5.

FIG. 5 is a view of the air cleaner 30 from which the cover 31A is detached when seen in a Z direction in FIG. 4. FIG. 6 is a view in which the element 32 is detached in FIG. 5. As illustrated in FIG. 6, the base 31B has a mount groove 36. As illustrated in FIG. 5, the element 32 is fitted in the mount groove 36. The element 32 is attached to the base 31B. The element 32 is shaped in a domical shape. The element 32 has a cup shape recessed in the direction opposite to the Z direction. The entire surface of the element 32 has a mesh pattern. The entire surface of the element 32 has holes (not shown) through which air can pass. The material for the element 32 is not specifically limited. The element 32 may be made of, for example, paper. In this preferred embodiment, the element 32 is made of urethane.

The element 32 has a side wall 20 extending upward, and an upper wall 29 located above the side wall 20. The side wall 20 includes a left rear wall 21, a left front wall 22, a front wall 26, right front wall 23, a right rear wall 24, and a rear wall 25. The left rear wall 21 extends forward and leftward. The left front wall 22 extends forward and rightward from the left rear wall 21. The front wall 26 extends rightward from the left front wall 22. The right front wall 23 extends rearward and rightward from the front wall 26. The right rear wall 24 extends rearward and leftward from the right front wall 23. The rear wall 25 extends leftward from the right rear wall 24 to the left rear wall 21. The upper wall 29 projects in the direction opposite to the Z direction.

Figure 7:
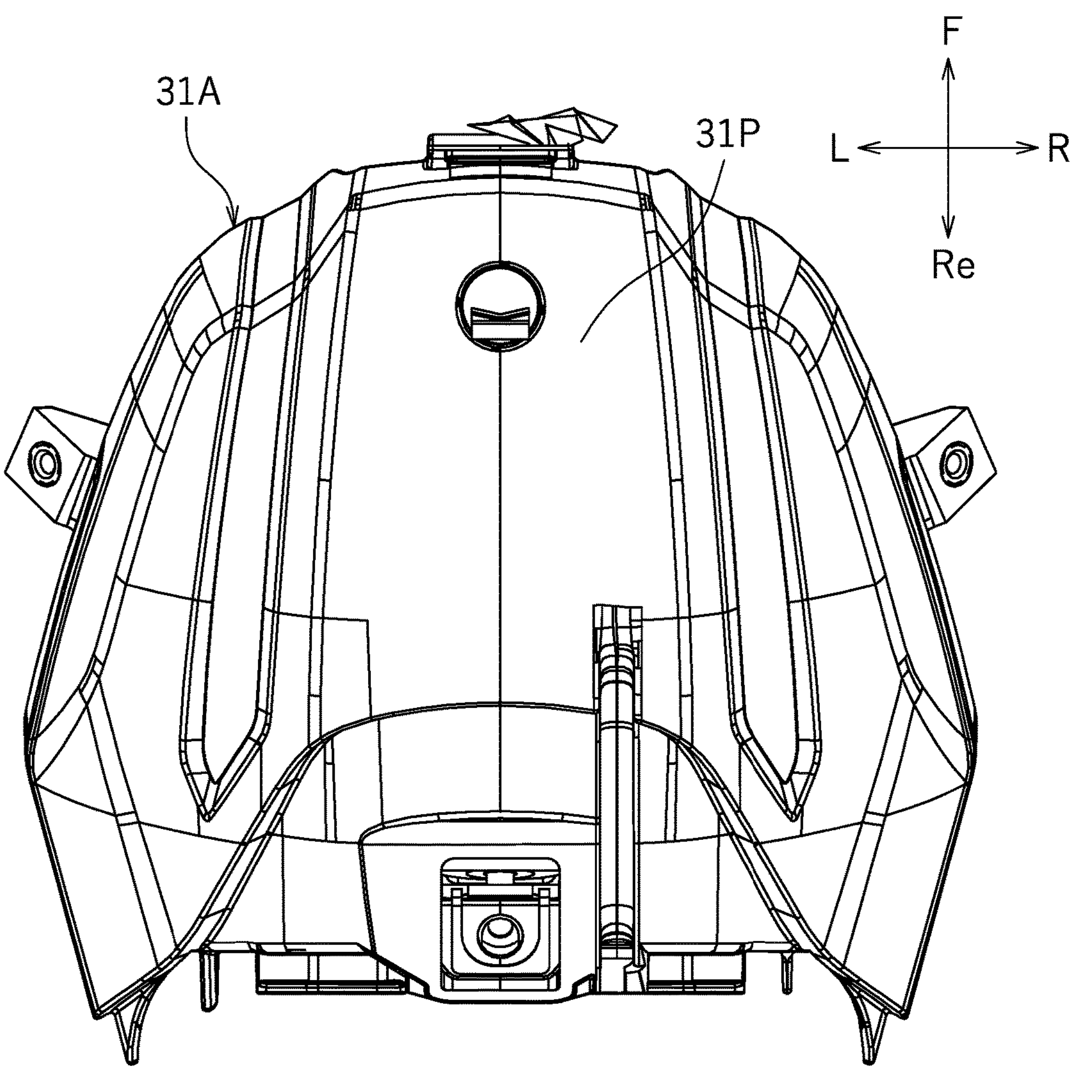
FIG. 7 is a front face view of a cover.
Figure 8:
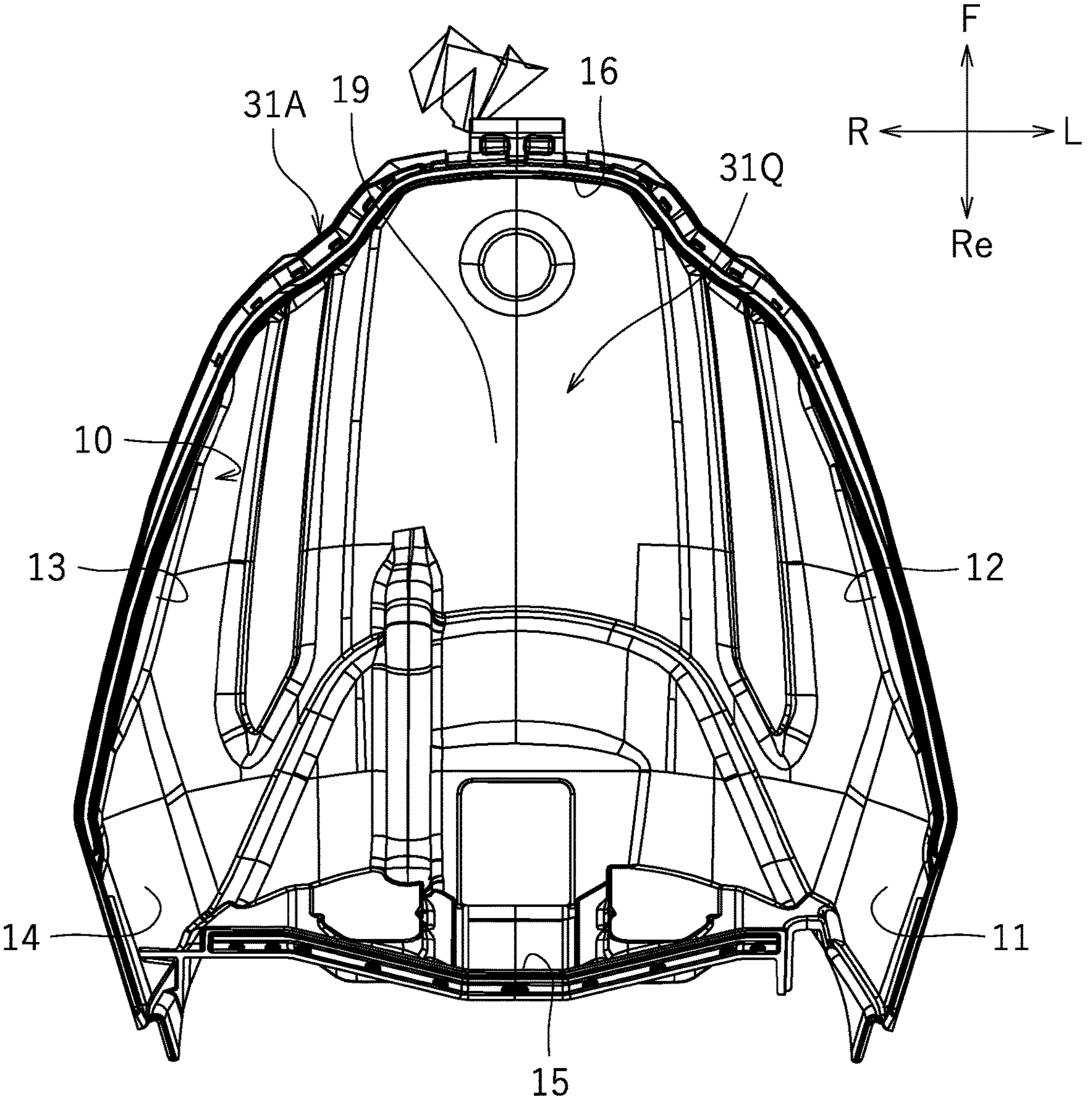
FIG. 8 is a rear face view of the cover.

FIG. 7 is a front face view of the cover 31A. The cover 31A has an outer surface 31P. FIG. 8 is a rear face view of the cover 31A. The cover 31A has an inner surface 31Q. As illustrated in FIG. 8, the inner surface 31Q of the cover 31A includes a side surface 10 extending upward, and a ceiling surface 19 located above the side surface 10. The side surface 10 includes a left rear surface 11, a left front surface 12, a front surface 16, a right front surface 13, a right rear surface 14, and a rear surface 15. The left rear surface 11 extends forward and leftward, and faces the left rear wall 21 of the element 32. The left front surface 12 extends forward and rightward from the left rear surface 11, and faces the left front wall 22 of the element 32. The front surface 16 extends rightward from the left front surface 12, and faces the front wall 26 of the element 32. The right front surface 13 extends rearward and rightward from the front surface 16, and faces the right front wall 23 of the element 32. The right rear surface 14 extends rearward and leftward from the right front surface 13, and faces the right rear wall 24 of the element 32. The rear surface 15 extends leftward from the right rear surface 14 to the left rear surface 11, and faces the rear wall 25 of the element 32. The ceiling surface 19 projects in the direction opposite to the Z direction (see FIG. 4). The ceiling surface 19 faces the upper wall 29 of the element 32.

Figure 9:
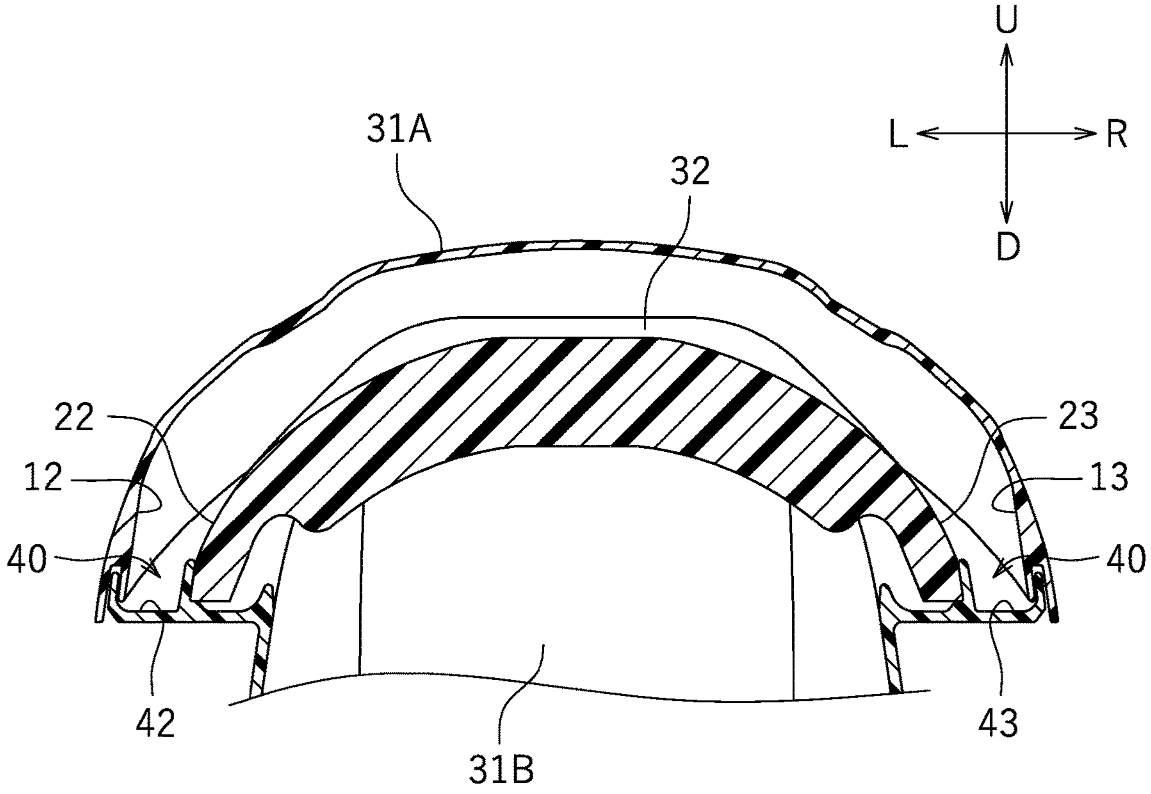
FIG. 9 is a cross-sectional view taken along line IX-IX in FIG. 3.

As illustrated in FIG. 5, the base 31B has a groove 40 surrounding the element 32. The groove 40 is formed around the side wall 20 of the element 32. The groove 40 is disposed between the side wall 20 of the element 32 and the side surface 10 of the cover 31A. FIG. 9 is a cross-sectional view taken along line IX-IX in FIG. 3. As illustrated in FIG. 9, the groove 40 is recessed downward. As illustrated in FIG. 5, the groove 40 has a left rear bottom surface 41, a left front bottom surface 42, a front bottom surface 46, a right front bottom surface 43, a right rear bottom surface 44, and a rear bottom surface 45. The left rear bottom surface 41 is disposed between the left rear wall 21 and the left rear surface 11, and extends forward and leftward. The left front bottom surface 42 is disposed between the left front wall 22 and the left front surface 12, and extends forward and rightward. The front bottom surface 46 is disposed between the front wall 26 and the front surface 16, and extends rightward. The right front bottom surface 43 is disposed between the right front wall 23 and the right front surface 13, and extends rearward and rightward. The right rear bottom surface 44 is disposed between the right rear wall 24 and the right rear surface 14, and extends rearward and leftward. The rear bottom surface 45 is disposed between the rear wall 25 and the rear surface 15, and extends leftward.

Figure 10:
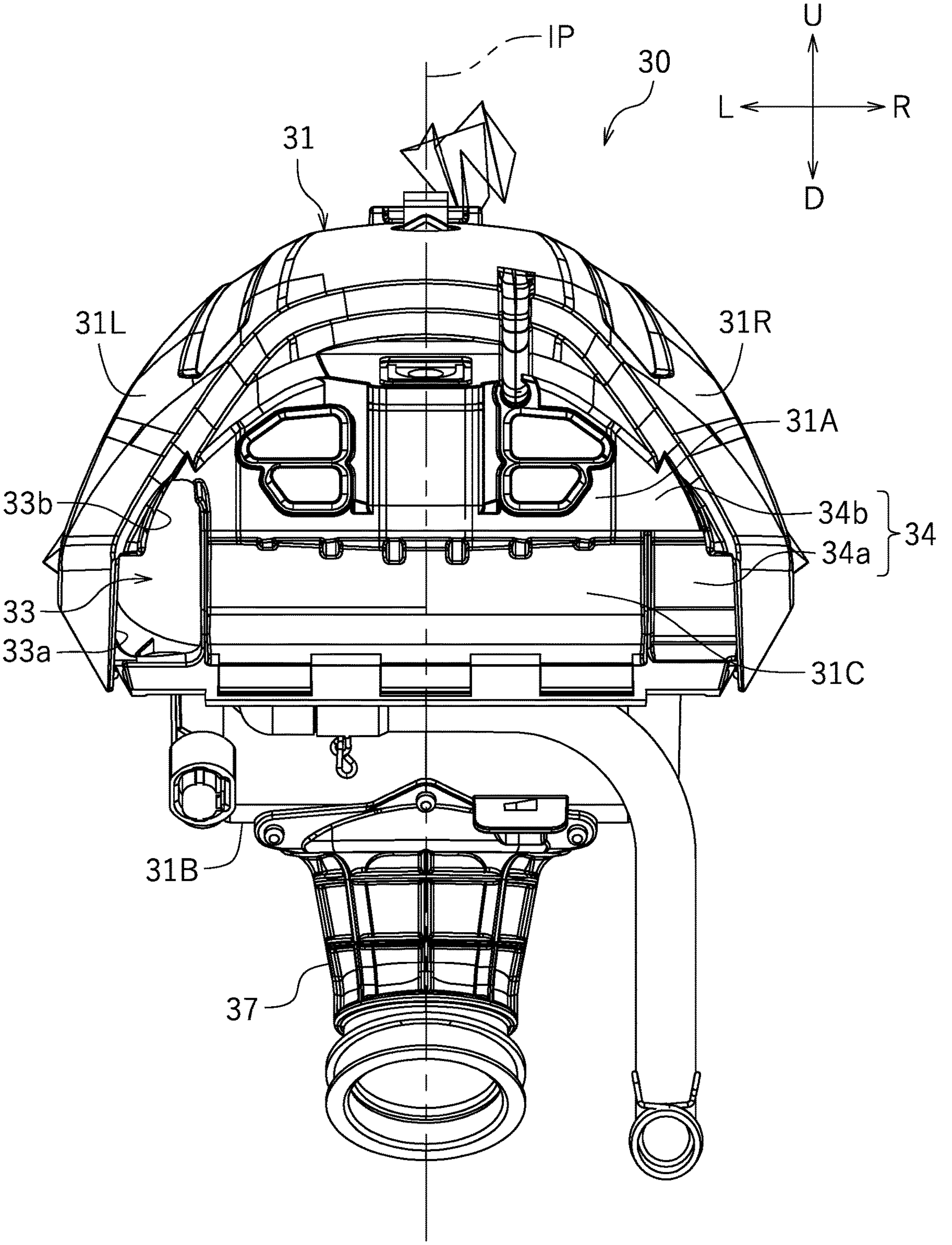
FIG. 10 is a view of the air cleaner seen in an X direction in FIG. 3.

FIG. 10 is a view of the air cleaner 30 seen in an X direction in FIG. 3. The X direction is perpendicular to the Z direction. As illustrated in FIG. 10, the air cleaner case 31 has a plate 31C (see also FIG. 4). The plate 31C extends in the left-right directions and the top-bottom directions. The plate 31C is attached to a rear portion of the base 31B and a rear portion of the cover 31A.

A vertical plane IP illustrated in FIG. 2 is an imaginary plane extending forward, rearward, upward, and downward. As illustrated in FIG. 10, the vertical plane IP passes through the center in the left-right directions (lateral center) of the air cleaner case 31. The air cleaner case 31 has a left half 31L located at the left of the imaginary plane IP, and a right half 31R located at the right of the imaginary plane IP. The left half 31L of the air cleaner case 31 has an intake port 33. The intake port 33 connects the outside of the air cleaner case 31 to the dirty side. Air outside the air cleaner case 31 is sucked into the dirty side through the intake port 33. FIG. 10 does not show the element 32 in order to make the contour of the intake port 33 easily understood.

In the air cleaner 30 according to this preferred embodiment, no other intake ports are formed at positions laterally symmetric (symmetric in the left-right directions) to the intake port 33. The air cleaner case 31 has a closed wall 34 at a position symmetric to the intake port 33 with respect to the vertical plane IP. In this preferred embodiment, the closed wall 34 includes a closed wall **34*b* as a portion of the cover 31A and a closed wall 34*a* as a portion of the plate 31**C.

In the air cleaner 30 according to this preferred embodiment, the right half 31R of the air cleaner case 31 does not have an intake port connecting the outside of the air cleaner case 31 to the dirty side. Air is sucked solely into the left half 31L of the air cleaner case 31. In the air cleaner 30 according to this preferred embodiment, only the intake port 33 is formed as the intake port connecting the outside of the air cleaner case 31 to the dirty side. Only one intake port is formed to connect the outside of the air cleaner case 31 to the dirty side.

The imaginary line in FIG. 5 represents the intake port 33, and arrow 33T represents the direction of the intake port 33. As illustrated in FIG. 5, the intake port 33 is located between the left rear wall 21 of the element 32 and the left rear surface 11 of the cover 31A (see FIG. 8) and is open toward the outside of the air cleaner case 31. Specifically, the intake port 33 is open rearward and rightward toward the outside of the air cleaner case 31. The intake port 33 is formed to allow the air to be sucked from the rear and the right. The directions described above are merely examples, and the direction of the intake port 33 is not limited to a specific direction. The shape of the intake port 33 is not specifically limited. In this preferred embodiment, the intake port 33 has an elongated shape as illustrated in FIG. 10. The intake port 33 is longer in the top-bottom directions than in the left-right directions. The intake port 33 has a lower portion **33*a* whose lateral width is uniform and an upper portion 33*b*** whose lateral width gradually decreases toward the top.

The configuration of the air cleaner 30 has been described above. Next, airflows in the air cleaner 30 will be described.

Air is sucked into the air cleaner case 31 from the intake port 33. As illustrated in FIG. 5, air sucked from the intake port 33 partially flows between the side wall 20 of the element 32 and the side surface 10 of the cover 31A as indicated by characters A1, A2, A6, A3, A4, and A5 to turn around the element 32. Here, character A1 represents an airflow between the left rear wall 21 of the element 32 and the left rear surface 11 of the cover 31A. Character A2 represents an airflow between the left front wall 22 of the element 32 and the left front surface 12 of the cover 31A. Character A6 represents an airflow between the front wall 26 of the element 32 and the front surface 16 of the cover 31A. Character A3 represents an airflow between the right front wall 23 of the element 32 and the right front surface 13 of the cover 31A. Character A4 represents an airflow between the right rear wall 24 of the element 32 and the right rear surface 14 of the cover 31A. Character A5 represents an airflow between the rear wall 25 of the element 32 and the rear surface 15 of the cover 31A. In this manner, in this preferred embodiment, an airflow turning around laterally is generated in the dirty side of the air cleaner case 31. That is, a swirl flow is generated.

Air sucked from the intake port 33 contains relatively large dirt in some cases. Since air flows around the element 32 along the side surface 10 of the cover 31A, dirt included in the air is likely to contact the side surface 10 under a centrifugal force. Dirt included in the air is separated from the air while flowing around the element 32. Relatively large dirt included in the air is separated while the air flows around the element 32. The separated dirt tends to be dropped by gravity. The separated dirt is collected into the groove 40 around the element 32.

A portion of the air sucked from the intake port 33 forms the swirl flow as described above, and flows along the side wall 20 of the element 32. The other portion of the air flows along the upper wall 29 of the element 32. In this manner, air flows along the entire surface of the element 32. Air near the surface of the element 32 passes through the element 32, and flows into the clean side. The air passes through the element 32 from the dirty side toward the clean side so that relatively small dirt included in the air, for example, is thereby removed by the element 32. The air is purified by the element 32. The purified air is supplied from the clean side to the engine 5 through the intake pipe 37.

Advantages obtained by the air cleaner 30 according to this preferred embodiment will now be described.

Figure 11:
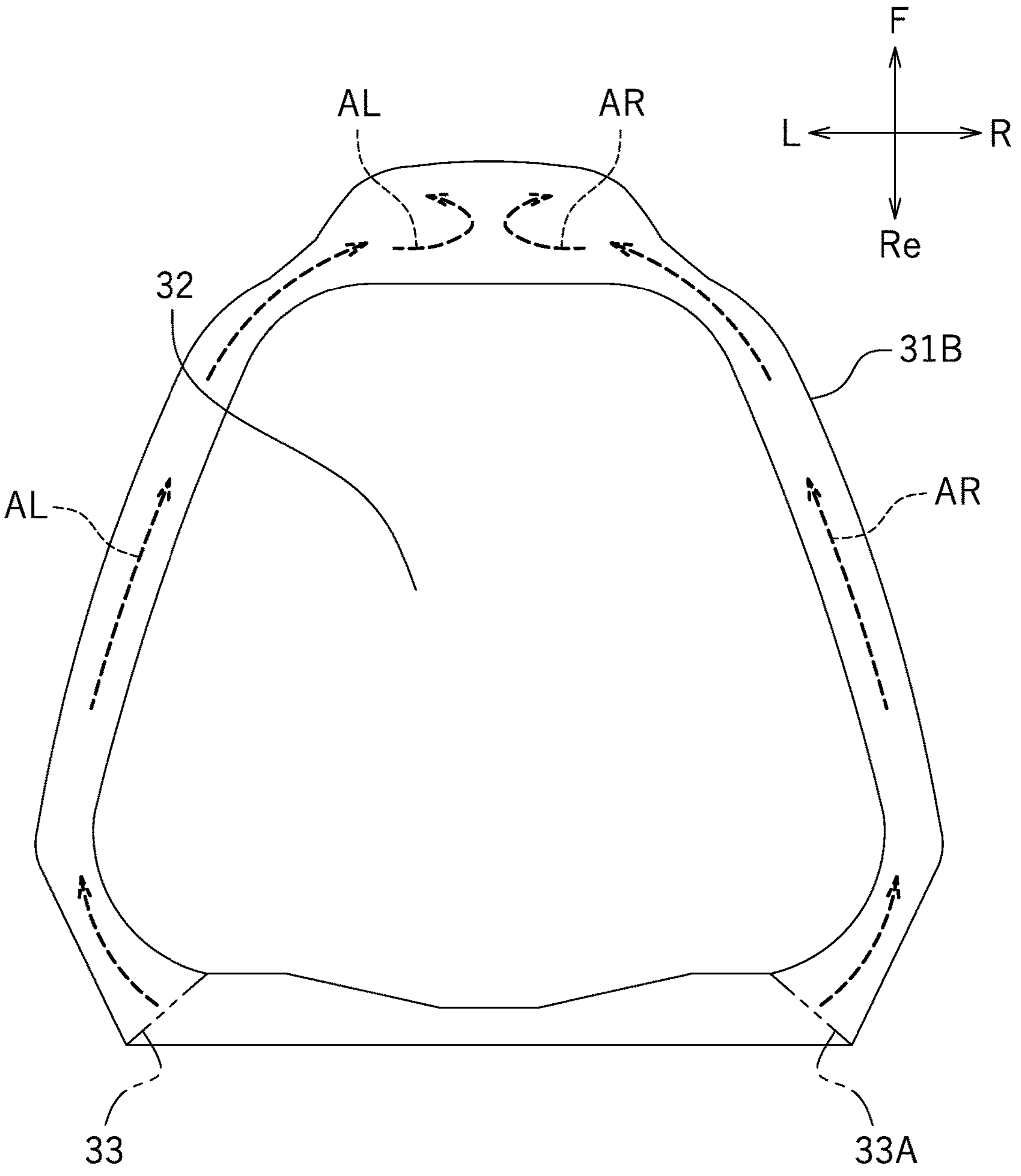
FIG. 11 is an illustration of airflows in a case where intake ports are formed laterally symmetric in an air cleaner case.

As illustrated in FIG. 11, in a case where the air cleaner case 31 has another intake port 33A laterally symmetric to the intake port 33, a left airflow AL sucked from the intake port 33 and a right airflow AR sucked from the intake port 33A tend to collide with each other. When the left airflow AL and the right airflow AR collide, however, a swirl flow is less likely to be generated. On the other hand, in this preferred embodiment, no other intake ports are formed at positions laterally symmetric to the intake port 33 of the air cleaner case 31, as illustrated in FIG. 10. In the air cleaner case 31, laterally symmetric airflows are not generated. An airflow is likely to turn in the air cleaner case 31.

Air sucked from the intake port 33 flows between the left rear wall 21 of the element 32 and the left rear surface 11 of the cover 31A, and then, flows between the left front wall 22 and the left front surface 12 (see arrows A1 and A2 in FIG. 5). Since the air sucked from the intake port 33 flows along the left rear wall 21 and the left front wall 22 of the element 32, a large area of the element 32 can be effectively utilized. In addition, since the air flows along the left rear surface 11 and the left front surface 12 of the cover 31A, the air flows around the element 32.

While air flows along the left rear surface 11 and the left front surface 12, relatively large dirt included in the air contacts the left rear surface 11 and the left front surface 12 to be thereby easily separated from the air. After the separation of relatively large dirt, the air passes through the element 32. In the manner described above, in the air cleaner 30 according to this preferred embodiment, air passes through a large area of the element 32 after relatively large dirt is separated from the air. Thus, in this preferred embodiment, air purification performance can be enhanced. Cleaner air can be supplied to the engine 5. In addition, the element 32 is relatively not easily soiled, the lifetime of the element 32 is prolonged.

In this preferred embodiment, the element 32 has the right front wall 23, and the cover 31A has the right front surface 13 facing the right front wall 23. Air sucked from the intake port 33 turns around the left side of the element 32 and then passes between the right front wall 23 and the right front surface 13 (see arrow A3 in FIG. 5). Air turns more than a half of the perimeter of the element 32. Accordingly, air can flow along a large area of the side wall 20 of the element 32, and air can flow along a large area of the side surface 10 of the cover 31A. The element 32 can be further effectively utilized, and dirt can be more easily separated from the air.

In this preferred embodiment, the element 32 has the right rear wall 24, and the cover 31A has the right rear surface 14 facing the right rear wall 24. Air sucked from the intake port 33 flows by the left side, the front side, and the right side of the element 32, and then passes between the right rear wall 24 and the right rear surface 14 (see arrow A4 in FIG. 5). Air turns around more than ¾ of the perimeter of the element 32. Accordingly, air can flow along a large area of the side wall 20 of the element 32, and air can flow along a large area of the side surface 10 of the cover 31A. The element 32 can be further effectively utilized, and dirt can be more easily separated from the air.

In this preferred embodiment, the element 32 has the rear wall 25, and the cover 31A has the rear surface 15 facing the rear wall 25. Air sucked from the intake port 33 flows by the left side, the front side, and the right side of the element 32, and then passes between the rear wall 25 and the rear surface 15 (see arrow A5 in FIG. 5). Air turns around the element more than once. Accordingly, air can flow along a large area of the side wall 20 of the element 32, and air can flow along a large area of the side surface 10 of the cover 31A. The element 32 can be further effectively utilized, and dirt can be more easily separated from the air.

In this preferred embodiment, the air cleaner case 31 has the groove 40 between the side wall 20 of the element 32 and the side surface 10 of the cover 31A. Dirt separated and dropped from the air can be collected in the groove 40. Dirt can be removed only by cleaning the groove 40. For example, dirt can be easily removed only by moving a sheet-like cleaner hooked on fingers along the groove 40. In this preferred embodiment, dirt can be accumulated in a portion where dirt can be easily removed, and thus, the air cleaner 30 can be easily maintained.

In this preferred embodiment, the intake port 33 is open rearward and rightward toward the outside of the air cleaner case 31. Thus, air sucked from the intake port 33 is likely to flow along the left rear wall 21 of the element 32 and the left rear surface 11 of the cover 31A. Air can be easily caused to flow along the side wall 20 of the element 32 and the inner surface 10 of the cover 31A.

In this preferred embodiment, the intake port 33 is formed only in the left half 31L of the air cleaner case 31 (see FIG. 10). The right half 31R of the air cleaner case 31 has no intake port connecting the outside of the air cleaner case 31 to the dirty side. Air does not flow into the right half 31R of the air cleaner case 31. Thus, air sucked from the intake port 33 formed in the left half 31L is likely to generate a swirl flow in the air cleaner case 31. Thus, relatively large dirt included in the air can be easily separated by turning the air. In addition, air can flow along a large area of the element 32 so that a large area of the element 32 can be thereby effectively utilized.

The number of intake ports 33 is not specifically limited, and is one in this preferred embodiment. The air cleaner case 31 has only the intake port 33 formed in the left half 31L as an intake port connecting the outside of the air cleaner case 31 to the dirty side. Air intensively sucked from the intake port 33 is likely to generate a swirl flow turning around the element 32. Turning of the air easily separates relatively large dirt included in the air. In addition, the air can flow along a large area of the element 32 so that a large area of the element 32 can be thereby effectively utilized.

In this preferred embodiment, the element 32 has the domical shape. As compared to a case where the element 32 has a flat plate shape, purification performance of the air cleaner 30 can be enhanced with size reduction thereof.

In this preferred embodiment, the entire surface of the element 32 has a mesh pattern. Since the air is purified in the entire surface of the element 32, purification performance of the air cleaner 30 can be enhanced with size reduction thereof.

In this preferred embodiment, the air cleaner case 31 includes the base 31B and the cover 31A, and the element 32 is disposed between the base 31B and the cover 31A. The element 32 is exposed by detaching the cover 31A from the base 31B. This configuration eases maintenance of the air cleaner 30.

One preferred embodiment has been described above, but the preferred embodiment is merely an example. Other various preferred embodiments may be made. Next, other embodiments will be briefly described.

Although the element 32 has the domical shape in the preferred embodiment, the shape of the element 32 is not specifically limited. The element 32 may have a shape other than a flat plate shape. The element 32 may have another shape having a curved surface. For example, the element 32 may have a cylindrical shape whose one end in the axial direction is closed. The element 32 may have a tubular shape with an oval cross section. For example, the element 32 may have a cylindrical shape whose axial direction extends along the Z direction (see FIG. 4). In this case, the advantages described above are also obtained by generating a swirl flow turning around the element 32 in the air cleaner case 31.

In the preferred embodiment, the intake port 33 is formed in the left half 31L of the air cleaner case 31, and no intake port is formed in the right half 31R. Alternatively, the intake port 33 may be formed in the right half 31R with no intake port formed in the left half 31L. In this case, a swirl flow that flows counterclockwise when seen in the z direction is generated in the air cleaner case 31.

In the preferred embodiment, the element 32 has the side wall 20 turning around the upward axis (i.e., axis extending in the direction opposite to the Z direction in FIG. 4). The air cleaner 30 according to the preferred embodiment is configured such that air turns laterally in the air cleaner case 31. The air cleaner 30 according to the preferred embodiment is configured such that a swirl flow is generated in the air cleaner case 31. In the preferred embodiment, forward, rearward, upward, downward, leftward, and rightward correspond to a first direction, a second direction, a third direction, a fourth direction, a fifth direction, and a sixth direction, respectively. Arrangement of the element 32, however, is not specifically limited. The element 32 may have the side wall 20 turning around the axis extending forward or leftward. The air cleaner 30 may be configured such that air turns longitudinally in the air cleaner case 31. The air cleaner 30 may be configured such that a tumble flow is generated in the air cleaner case 31. For example, the first direction, the second direction, the third direction, the fourth direction, the fifth direction, and the sixth direction may be forward, rearward, leftward, rightward, downward, and upward, respectively.

The left half 31L of the air cleaner case 31 has only one intake port 33 in the preferred embodiment, but a plurality of intake ports 33 may be formed in the left half 31L with no intake port formed in the right half 31R.

Both the left half 31L and the right half 31R may have intake ports as long as airflows along the side wall 20 of the element 32 and the inner surface 10 of the cover 31A are generated. Even in the case where both the left half 31L and the right half 31R have intake ports, a swirl flow can be generated around the element 32 as long as left and right intake ports are not formed laterally symmetric. As long as the air cleaner case 31 has the closed wall 34 at a position symmetric to a portion or whole of the intake port 33 with respect to the vertical plane IP, a swirl flow can be generated around the element 32. In view of this, the left and right intake ports may be different in shape or size such that one of a left airflow and a right airflow in the element 32 is stronger than the other.

The groove 40 is preferably provided in order to enhance maintainability, but the groove 40 may not be provided. A portion or whole of the groove 40 may be omitted. The air cleaner case 31 does not need to have the groove 40.

The entire surface of the element 32 may not have a mesh pattern. For example, the side wall 20 of the element 32 may have a mesh pattern with a portion or whole of the upper wall 29 having no mesh pattern.

The straddled vehicle refers to a vehicle on which a passenger is to be astride. The straddled vehicle is not limited to the motorcycle 1. The straddled vehicle may be an electric tricycle, an all terrain vehicle (ATV), or a snowmobile, for example.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of embodiments of principles of the present invention. These examples are described herein with the understanding that such examples are not intended to limit the present invention to the preferred embodiments described herein and/or illustrated herein. Hence, the present invention is not limited to the embodiments described herein. The present invention includes any and all embodiments including equivalent elements, modifications, omissions, combinations, adaptations and/or alterations as would be appreciated by those skilled in the art on the basis of the present disclosure. The limitations in the claims are to be interpreted broadly based on the terms used in the claims and not limited to embodiments described in the present specification or during the prosecution of the application.

What is claimed is:

1. An air cleaner comprising:

an air cleaner case;

an element disposed in the air cleaner case and partitioning an inside of the air cleaner case into a clean side and a dirty side; and an intake port disposed in the air cleaner case and connecting an outside of the air cleaner case to the dirty side, wherein with respect to a first direction and a second direction that are opposite to each other, a third direction and a fourth direction that are opposite to each other and are perpendicular to the first direction, and a fifth direction and a sixth direction that are opposite to each other, and are perpendicular to the first direction and the third direction, the first to fourth directions being in an imaginary plane, the air cleaner case includes a first half located at one side of the imaginary plane in the fifth direction and a second half located at the other side of the imaginary plane in the sixth direction, the element includes a first element side wall extending in the first direction and the fifth direction, and a second element side wall extending from the first element side wall in the first direction and the sixth direction, the air cleaner case includes a first case inner surface extending in the first direction and the fifth direction and facing the first element side wall, and a second case inner surface extending from the first case inner surface in the first direction and the sixth direction and facing the second element side wall, the intake port is disposed in the first half of the air cleaner case, located between the first element side wall and the first case inner surface, and open to the outside of the air cleaner case, and the air cleaner case further includes a closed wall at a position substantially reflectionally symmetric to a position of the intake port with respect to the imaginary plane.

2. The air cleaner according to claim 1, wherein the third direction is upward.

3. The air cleaner according to claim 1, wherein the third direction is leftward.

4. An air cleaner comprising:

an air cleaner case;

an element disposed in the air cleaner case and partitioning an inside of the air cleaner case into a clean side and a dirty side; and an intake port disposed in the air cleaner case and connecting an outside of the air cleaner case to the dirty side, wherein with respect to a first direction and a second direction that are opposite to each other, a third direction and a fourth direction that are opposite to each other and are perpendicular to the first direction, and a fifth direction and a sixth direction that are opposite to each other, and are perpendicular to the first direction and the third direction, the first to fourth directions being in an imaginary plane, the air cleaner case includes a first half located at one side of the imaginary plane in the fifth direction and a second half located at the other side of the imaginary plane in the sixth direction, the element includes a first element side wall extending in the first direction and the fifth direction, and a second element side wall extending from the first element side wall in the first direction and the sixth direction, the air cleaner case includes a first case inner surface extending in the first direction and the fifth direction and facing the first element side wall, and a second case inner surface extending from the first case inner surface in the first direction and the sixth direction and facing the second element side wall, the intake port is disposed in the first half of the air cleaner case, located between the first element side wall and the first case inner surface, and open to the outside of the air cleaner case, and the air cleaner case further includes a closed wall at a position substantially symmetric to a position of the intake port with respect to the imaginary plane, the first direction, the second direction, the third direction, and the fourth direction are forward, rearward, upward, and downward, respectively, and one of the fifth direction and the sixth direction is leftward, and the other thereof is rightward.

5. The air cleaner according to claim 1, wherein the first direction, the second direction, the third direction, and the fourth direction are forward, rearward, upward, and downward, respectively, one of the fifth direction and the sixth direction is leftward, and the other thereof is rightward, and the air cleaner case further includes a groove having a first bottom surface located between the first element side wall and the first case inner surface, and a second bottom surface located between the second element side wall and the second case inner surface.

6. The air cleaner according to claim 1, wherein the element further includes a third element side wall located at a side of the second element side wall in the sixth direction, and extending in the second direction and the sixth direction, and the air cleaner case includes a third case inner surface located at a side of the second case inner surface in the sixth direction, extending in the second direction and the sixth direction, and facing the third element side wall.

7. The air cleaner according to claim 6, wherein the first direction, the second direction, the third direction, and the fourth direction are forward, rearward, upward, and downward, respectively, one of the fifth direction and the sixth direction is leftward, and the other thereof is rightward, and the air cleaner case further includes a groove having a first bottom surface located between the first element side wall and the first case inner surface, a second bottom surface located between the second element side wall and the second case inner surface, and a third bottom surface located between the third element side wall and the third case inner surface.

8. The air cleaner according to claim 6, wherein the element further includes a fourth element side wall extending from the third element side wall in the second direction and the fifth direction, and the air cleaner case further includes a fourth case inner surface extending from the third case inner surface in the second direction and the fifth direction and facing the fourth element side wall.

9. The air cleaner according to claim 8, wherein the first direction, the second direction, the third direction, and the fourth direction are forward, rearward, upward, and downward, respectively, one of the fifth direction and the sixth direction is leftward, and the other thereof is rightward, and the air cleaner case further includes a groove having a first bottom surface located between the first element side wall and the first case inner surface, a second bottom surface located between the second element side wall and the second case inner surface, a third bottom surface located between the third element side wall and the third case inner surface, and a fourth bottom surface located between the fourth element side wall and the fourth case inner surface.

10. The air cleaner according to claim 8, wherein the element further includes a fifth element side wall extending from the fourth element side wall in the fifth direction, and the air cleaner case further includes a fifth case inner surface extending from the fourth case inner surface in the fifth direction and facing the fifth element side wall.

11. The air cleaner according to claim 10, wherein the first direction, the second direction, the third direction, and the fourth direction are forward, rearward, upward, and downward, respectively, one of the fifth direction and the sixth direction is leftward, and the other thereof is rightward, and the air cleaner case further includes a groove having a first bottom surface located between the first element side wall and the first case inner surface, a second bottom surface located between the second element side wall and the second case inner surface, a third bottom surface located between the third element side wall and the third case inner surface, a fourth bottom surface located between the fourth element side wall and the fourth case inner surface, and a fifth bottom surface located between the fifth element side wall and the fifth case inner surface.

12. The air cleaner according to claim 1, wherein the intake port is open in the second direction and the sixth direction toward the outside of the air cleaner case.

13. The air cleaner according to claim 1, wherein the second half of the air cleaner case has no intake port connecting the outside of the air cleaner case to the dirty side.

14. The air cleaner according to claim 1, wherein the air cleaner case has only one intake port connecting the outside of the air cleaner case to the dirty side, and said one intake port is the intake port disposed in the first half thereof.

15. The air cleaner according to claim 1, wherein the element has a domical shape.

16. The air cleaner according to claim 15, wherein the element has a mesh pattern on an entire surface thereof.

17. The air cleaner according to claim 1, wherein the air cleaner case further includes a base and a cover disposed at a side of the third direction with respect to the base, and the element is disposed between the base and the cover.

18. A straddled vehicle comprising:

the air cleaner according to claim 1;

an intake pipe connected to the clean side of the air cleaner case; and an internal combustion engine connected to the intake pipe.

* * * * *